US011973596B2

(12) United States Patent
Singh et al.

(10) Patent No.: US 11,973,596 B2
(45) Date of Patent: Apr. 30, 2024

(54) COMMON NACK FOR UPLINK GRANT-FREE TRANSMISSIONS

(71) Applicant: Telefonaktiebolaget LM Ericsson (publ), Stockholm (SE)

(72) Inventors: Bikramjit Singh, Kirkkonummi (FI); John Walter Diachina, Garner, NC (US); Majid Gerami, Lund (SE); Alexey Shapin, Luleå (SE); Yufei Blankenship, Kildeer, IL (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 205 days.

(21) Appl. No.: 17/296,634

(22) PCT Filed: Apr. 9, 2019

(86) PCT No.: PCT/SE2019/050329
§ 371 (c)(1),
(2) Date: May 25, 2021

(87) PCT Pub. No.: WO2020/145858
PCT Pub. Date: Jul. 16, 2020

(65) Prior Publication Data
US 2022/0021485 A1     Jan. 20, 2022

Related U.S. Application Data

(60) Provisional application No. 62/791,298, filed on Jan. 11, 2019.

(51) Int. Cl.
*H04L 1/06*     (2006.01)
*H04L 1/08*     (2006.01)
(Continued)

(52) U.S. Cl.
CPC .............. *H04L 1/1671* (2013.01); *H04L 1/08* (2013.01); *H04L 1/1685* (2013.01); *H04L 1/1819* (2013.01)

(58) Field of Classification Search
CPC ....... H04L 1/08; H04L 1/1671; H04L 1/1685; H04L 1/1819
See application file for complete search history.

(56) References Cited

U.S. PATENT DOCUMENTS 9,750,006 B2 *   8/2017   McBeath ............... H04W 72/23
2009/0268693 A1 * 10/2009   Lindh .................... H04W 72/23
                                                     370/336

(Continued)

FOREIGN PATENT DOCUMENTS

WO   2017167198 A1   10/2017

OTHER PUBLICATIONS

PCT International Search Report and Written Opinion dated Oct. 23, 2019 for International Application No. PCT/SE2019/050329, 14 pages.

(Continued)

*Primary Examiner* — Phuc H Tran
(74) *Attorney, Agent, or Firm* — Sage Patent Group (57) ABSTRACT

There is presented a method for operating a user equipment, UE (300) in a wireless communication network (10). The method comprises receiving (302) a message indicating an uplink radio resource, the uplink resource having occurred before receiving the message. The method further comprises transmitting (304) a second representation of a data packet based on determining that the indicated uplink radio resource has been used by the UE for transmitting a first representation of the data packet, prior to receiving the message. Additionally, a method for operating a network node (200) in a wireless communication network (10) is (Continued)

Example signaling diagram of broadcasting common NACK message with implicit resource information of unknown packets. In the example, UE#B's initial GF packet decoded successfully but UE#A's UE ID failed to be decoded. After sending common NACK within the timer, both UEs resend their packets.

disclosed, the method comprises detecting (202) a signal on an uplink resource configured for grant free access and transmitting (204) a non-UE specific message based on the signal not being successfully received and wherein the non-UE specific message comprises information indicating the uplink resource configured for grant free access. Corresponding network node and user equipment are also presented.

15 Claims, 8 Drawing Sheets

(51) Int. Cl.
*H04L 1/1607* (2023.01)
*H04L 1/1812* (2023.01)

(56) References Cited

U.S. PATENT DOCUMENTS

| | | | | |
|---|---|---|---|---|
| 2010/0215011 | A1* | 8/2010 | Pan | H04L 5/0091 370/329 |
| 2017/0288817 | A1* | 10/2017 | Cao | H04L 1/0079 |
| 2018/0152927 | A1 | 5/2018 | Kim et al. | |
| 2018/0279274 | A1* | 9/2018 | Sun | H04L 1/1896 |
| 2019/0132824 | A1* | 5/2019 | Jeon | H04L 5/00 |
| 2019/0141679 | A1* | 5/2019 | He | H04L 5/0091 |
| 2019/0181976 | A1* | 6/2019 | Golitschek Edler von Elbwart | H04W 72/0453 |
| 2019/0394732 | A1* | 12/2019 | Loehr | H04W 52/365 |
| 2020/0187237 | A1* | 6/2020 | Su | H04L 1/1896 |
| 2020/0322946 | A1* | 10/2020 | Jiang | H04W 68/005 |
| 2021/0127367 | A1* | 4/2021 | Yi | H04W 72/0453 |

OTHER PUBLICATIONS

3GPP, LG Electronics, 3GPP TSG RAN WG1 Meeting #86bis, R1-1609226, "Discussion on Feedback Signaling for Grant-Free MA", Lisbon, Portugal, Oct. 10-14, 2016, XP051149272, 3 pages.
3GPP, Technical Specification Group Services and System Aspects, "Study on Communication for Automation in Vertical Domains", (Release 16), 3GPP TR 22.804 V16.1.0 (Sep. 2018), Valbonne, France, 191 pages.
3GPP, Technical Specification Group Radio Access Network; NR; "Physical Layer Procedures for Data", (Release 15), 3GPP TS 38.214 V15.3.0 (Sep. 2018), Valbonne, France, 96 pages.
ETSI MCC, 3GPP TSG-RAN WG2 Meeting #101, R2-1801701, "Report of 3GPP TSG RAN2#100 Meeting, Reno, Nevada, USA", Athens, Greece, Feb. 26-Mar. 2, 2018, 212 pages.
3GPP, Technical Specification Group Services and System Aspects, "Service Requirements for the 5G System", Stage 1 (Release 16), 3GPP TS 22.261 V16.5.0 (Sep. 2018), Valbonne, France, 67 pages.

* cited by examiner

Fig. 1. Example signaling diagram of broadcasting common NACK message containing resource information of unknown packets.

Fig. 2. Example signaling diagram of broadcasting common NACK message with implicit resource information of unknown packets. In the example, UE#B's initial GF packet decoded successfully but UE#A's UE ID failed to be decoded. After sending common NACK within the timer, both UEs resend their packets.

Fig. 3a. An example of a broadcasted common NACK message

Fig. 3b. An example of a broadcasted common NACK message with additional retransmission resource information

```
-- ASN1START
-- TAG-CONFIGUREDGRANTCONFIG-START

ConfiguredGrantConfig ::=          SEQUENCE {
    frequencyHopping                   ENUMERATED {intraSlot, interSlot}                                                          OPTIONAL,   -- Need S
    cg-DMRS-Configuration              DMRS-UplinkConfig,
    mcs-Table                          ENUMERATED {qam256, qam64LowSE}                                                            OPTIONAL,   -- Need S
    mcs-TableTransformPrecoder         ENUMERATED {qam256, qam64LowSE}                                                            OPTIONAL,   -- Need S
    uci-OnPUSCH                        SetupRelease { CG-UCI-OnPUSCH }                                                             OPTIONAL,   -- Need M
    resourceAllocation                 ENUMERATED { resourceAllocationType0, resourceAllocationType1, dynamicSwitch },
    rbg-Size                           ENUMERATED {config2}                                                                        OPTIONAL,   -- Need S
    powerControlLoopToUse              ENUMERATED {n0, n1},
    p0-PUSCH-Alpha                     P0-PUSCH-AlphaSetId,
    transformPrecoder                  ENUMERATED {enabled, disabled}                                                             OPTIONAL,   -- Need S
    nrofHARQ-Processes                 INTEGER (1..16),
    repK                               ENUMERATED {n1, n2, n4, n8},
    repK-RV                            ENUMERATED {s1-0231, s2-0303, s3-0000}                                                     OPTIONAL,   -- Need R
    periodicity                        ENUMERATED {
                                           sym2, sym7, sym1x14, sym2x14, sym4x14, sym5x14, sym8x14, sym10x14, sym16x14, sym20x14,
                                           sym32x14, sym40x14, sym64x14, sym80x14, sym128x14, sym160x14, sym256x14, sym320x14, sym512x14,
                                           sym640x14, sym1024x14, sym1280x14, sym2560x14, sym5120x14,
                                           sym6, sym1x12, sym2x12, sym4x12, sym5x12, sym8x12, sym10x12, sym16x12, sym20x12, sym32x12,
                                           sym40x12, sym64x12, sym80x12, sym128x12, sym160x12, sym256x12, sym320x12, sym512x12, sym640x12,
                                           sym1280x12, sym2560x12
                                       },
    configuredGrantTimer               INTEGER (1..64)                                                                             OPTIONAL,   -- Need R
    rrc-ConfiguredUplinkGrant          SEQUENCE {
        timeDomainOffset                   INTEGER (0..5119),
        timeDomainAllocation               INTEGER (0..15),
        frequencyDomainAllocation          BIT STRING (SIZE(18)),
        antennaPort                        INTEGER (0..31),
        dmrs-SeqInitialization             INTEGER (0..1),
        precodingAndNumberOfLayers         INTEGER (0..63),
        srs-ResourceIndicator              INTEGER (0..15),
        mcsAndTBS                          INTEGER (0..31),
        frequencyHoppingOffset             INTEGER (1..maxNrofPhysicalResourceBlocks-1)                                            OPTIONAL,   -- Need R
        pathlossReferenceIndex             INTEGER (0..maxNrofPUSCH-PathlossReferenceRSs-1),
        ...
    }                                                                                                                              OPTIONAL,   -- Need R
    configuredGrantResourceID          INTEGER (1..64)                                                                             OPTIONAL,   -- Need R
    ...
}

CG-UCI-OnPUSCH ::=                 CHOICE {
    dynamic                            SEQUENCE (SIZE (1..4)) OF BetaOffsets,
    semiStatic                         BetaOffsets
}

-- TAG-CONFIGUREDGRANTCONFIG-STOP
-- ASN1STOP
```

Fig. 4: Example of RRC configuration, when "*ConfiguredGrantConfig*" information element is used

COMMON NACK FOR UPLINK GRANT-FREE TRANSMISSIONS

CROSS-REFERENCE TO RELATED APPLICATIONS

This application is a 35 U.S.C. § 371 national stage application for International Application No. PCT/SE2019/050329, entitled "COMMON NACK FOR UPLINK GRANT-FREE TRANSMISSIONS", filed on Apr. 9, 2019, which claims priority to U.S. Provisional Patent Application No. 62/791,298, filed on Jan. 11, 2019, the disclosures and contents of which are hereby incorporated by reference in their entireties.

TECHNICAL FIELD

Embodiments presented herein relate to a method for a network node, a network node, a method for a UE and a UE for transmission/reception of HARQ feedback in a communications network.

BACKGROUND

The 5th Generation (5G) telecommunication systems according to 3GPP is planned to be introduced in the early 2020s, envisioning to address new services and use cases. These new services are not only for human interaction, but also aim at a huge growth in Machine-Type Communications driven by e.g., factory automation and flexible process control. Ultra-reliable and low-latency communication (URLLC) is one important enabler to support these new services.

The most stringent requirement on URLLC currently being studied in $3^{rd}$ Generation Partnership Project (3GPP) Radio Access Network Work Group is 99.999%-99.9999999% reliability under the radio latency bound of 1 milli second (ms) [1-2]. The maximum packet error rate must not be higher than $10^{-5}$-$10^{-9}$, where maximum allowable radio latency, including retransmissions, is down to 1 ms. With the new numerology consideration for 5G New Radio (NR), for example 0.125 ms. Transmission Time Interval (TTI) size or even shorter mini-slot concept and each TTI contains both control and data information, there is a possibility to support Uplink (UL) grant-free (GF) transmissions with 1 ms latency.

I may be considered that a Configured Grant (CG) resource allocation may allow for grant free access. Configured Grant may allow for transmission by a wireless device without receiving a dynamic grant from the network which may be considered a grant free (GF) access. GF access is assumed to enable low latency access since e.g. signaling to access the network (e.g. random access procedure) for data transmission can be avoided and/or reduced. Therefore, GF access is considered an option for URLLC provisioning [3]. To support extremely high reliability of order of, e.g., 99.9999% [1], or 99.9999999% it is e.g. agreed to allow for the use of multiple (K) GF repetitions and that No Acknowledgement (NACK) based feedback utilization can be used for retransmission [3-4].

This disclosure focuses on the feedback aspect (e.g transmissions of ACK/NACK such as ACKnowledgement or No ACKnowledgement) to improve reliability for transmissions (such as URLLC transmissions) with CG for both 5G NR and LTE. Currently, NACK based feedback can be sent to a User Equipment (UE), whose transmission was not received properly by the gNB, given that the UE is identified by the gNB. Further, there is a view of providing Acknowledgement (ACK) based feedback support in case of uplink transmissions using CG resources. This can indirectly help a UE to retransmit its packet in case it does not receive ACK because of its failed transmission.

To have low latency access for UL URLLC, 3GPP has agreed to support Grant Free, GF, or Semi-Persistent Scheduling, SPS, transmissions in the form of Configured Grant, CG [2]. Considering random Uplink, UL, traffic (e.g. GF access), which implies that a gNB has no a-priori knowledge of the transmissions, and if such transmission fails, the gNB can possibly provide a NACK (with or without exclusive grant) to the UE. This is assumed to happen only when the packet or UE Identity (ID) is identified. A UE ID can e.g. be determined from a UE-specific Demodulation Reference Signal (DMRS), or even a shared DMRS, which is mutually exclusive to (e.g. not the same as) the data part.

If a gNB is unable to decode a DMRS sequence associated with a data packet (e.g. a transport block or a code block), the UE may not be identifiable and a NACK for the data packet cannot be provided to the UE. According to [4], if no feedback for a data packet is delivered by the gNB within a certain time, the UE will assume that the transmitted data packet was received correctly by the gNB. This will decrease the reliability for uplink transmissions using configured grant, CG, resources.

SUMMARY

Therefore, it is suggested to introduce a broadcasted message (e.g. a common NACK message), wherein the message indicates an uplink resource that was used by a gNB for receiving a data packet on configured grant resource without successfully decoding a UE- or packet identity. For the unsuccessful decoding of uplink transmissions and/or receptions of data packets using configured grant resources, when a corresponding packet identity or UE ID (e.g., DMRS sequence) cannot be successfully decoded, then exclusive or individual grants to the unsuccessful UEs are not possible with existing functionality.

According to a first aspect, there is disclosed a method for operating a radio network node in a wireless communication network. The method comprises detecting a signal on an uplink radio resource that is configured for grant free access and transmitting a non-UE specific message based on the signal not being successfully received (e.g, if it is determined that the signal was detected but cannot be associated with a specific UE). The non-UE specific message comprises information indicating the uplink resource that is configured for grant free access, e.g. indicating the uplink resource on which the signal was detected.

In a second aspect, there is disclosed a method for operating a user equipment, UE in a wireless communication network. The method comprises receiving a message indicating an uplink radio resource wherein the uplink resource having occurred before receiving the message. The method further comprises transmitting a second representation of a data packet when it is determined that the indicated uplink radio resource has been used by the UE for transmitting a first representation of the data packet.

According to a third aspect, there is disclosed a network node including processing circuitry adapted to detect a signal on an uplink resource configured for grant free access. The processing circuitry is further adapted to transmit a non-UE specific message if determined that the signal was not successfully received, e.g. if it is determined that the signal cannot be associated with a specific UE. The non-UE specific message comprises information indicating the uplink resource configured for grant free access, e.g. indicating the uplink resource on which the signal was detected.

According to a fourth aspect, there is disclosed a user equipment including processing circuitry adapted to receive a message indicating an uplink radio resource wherein the uplink resource having occurred before receiving the message. The processing circuitry is further adapted to transmit a second representation of a data packet based on determining that the indicated uplink radio resource has been used by the UE for transmitting a first representation of the data packet.

It may be considered that the message is received on resources belonging to a common search space. In particular, the message is may be a Downlink Control Information, DCI, received on Physical Dedicated Control Channel, PDCCH, wherein the DCI is a group common DCI associated with a radio network temporary identifier, RNTI, dedicated for transmitting group common DCI It may be considered that the second representation of the data packet is transmitted using a second resource, wherein the second resource being indicated in the message. Further, it may be considered that the second resource and/or the indicated uplink resource is a configured grant resource.

Optionally, the indicated uplink radio resource is a configured grant resource that has occurred no more than T ms prior to receiving the message.

The non-UE specific message may be a broadcasted message or a group cast message or a multi-cast message.

The non-UE specific message may be transmitted on resources belonging to a common search space.

The non-UE specific message may be a Downlink Control Information, DCI, transmitted on Physical Dedicated Control Channel, PDCCH. In particular, the DCI may be a group common DCI associated with a radio network temporary identifier, RNTI, dedicated for transmitting group common DCI.

In some aspects the uplink radio resource may be a configured grant resource that has occurred no more than T ms prior to transmitting the non-UE specific message.

The method according to the first aspect may optionally comprise determining that the signal was not successfully received by determining that a power and/or an energy and/or a signal quality (e.g. SINR, SNR, RSRQ) of the signal is greater than a first threshold.

Alternatively, the method according to the first aspect may optionally comprise receiving an indication indicating that payload was pending for one or more UEs configured for grant free access on the uplink resource and determining that the signal was not successfully received by determining that a power and/or an energy and/or a signal quality of the signal is less than a second threshold.

The first- and/or second thresholds may be adjusted based on channel conditions and/or history of transmission errors.

The key advantages of the above aspects are e.g. that the non-UE specific message (e.g. a common NACK message) transmitted by the network node, ensures retransmission of unknown transmissions which enables reaching the given URLLC reliability target. This helps to circumvent the alternative of using ACK signaling to confirm all successful receptions of uplink transmissions by a radio network node, which can be an extra ordinary overhead. If ACK signaling is explicit, e.g., assuming 99% of time packet transmission is successful, then basically 99% of time ACK signaling is used. In contrast, when using the proposed common NACK signaling, then probably less than 1% of the time, common NACK signaling is utilized. When a data packet is not successfully decoded, but the data packet or the UE is identifiable, a dedicated NACK message may be transmitted to a specific UE. The network node will have an improved ability to detect the occurrence of "no energy detected" conditions for which it can reasonably suspect a corresponding packet transmission was attempted (but not received) and therefore send a common NACK message that triggers the affected UE(s) to perform a packet retransmission.

Therefore, this disclosure is directed towards an improved feedback design for achieving extremely high reliability. This improved feedback design may be used together with with other improvements, e.g., K repetitions, MCS schemes improvements, as the overall objective to achieve target reliability within the latency bound but with small resource utilization and available infrastructure. The proposed solution is not limited URLLC provisioning. It can be applied to any UE transmitting in a GF or contention-based manner, e.g., in WiFi, ALOHA scenarios, massive-MTC, etc. . . .

BRIEF DESCRIPTION OF THE DRAWINGS

The inventive concept is now described, by way of example, with reference to the accompanying drawings, in which:

FIG. 4 illustrates an example of information in a configuration message to configure a UE with Configured Grant (CG) so that the UE may use Grant Free transmissions.

DETAILED DESCRIPTION

The inventive concept will now be described more fully with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any action or feature illustrated by dashed lines should be regarded as optional.

Figure 1:
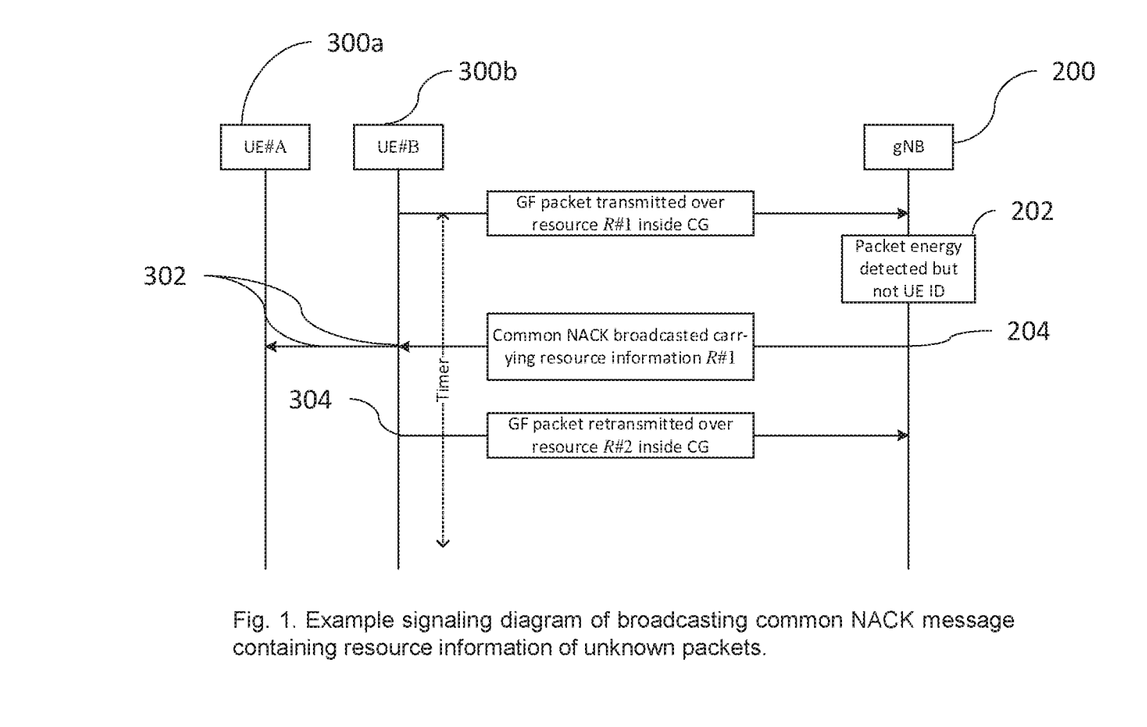
FIGS. 1 and 2 illustrate examples of broadcasting a common NACK message comprising explicit and implicit resource information of where a gNB e.g. has detected a UE transmission without being able identify the UE ID

FIG. 1 illustrates a network node 200 and two wireless devices, 300a and 300b. The network node and the wireless devices are configured for operation in a wireless communication network, e.g., a cellular communications network based on 3GPP technology. By way of example, the network node is represented by a radio access node, such as a base station of the network, and the wireless devices are represented by User Equipments (UEs) or other wireless communication devices configured for communicating with the network node.

Examples of network nodes comprise radio network nodes such as e.g. radio access network nodes, radio base stations, base transceiver stations, Node Bs, evolved Node Bs, g Node Bs (gNB), Integrated Access and Backhaul (IAB) node and access points (e.g. a WiFi access point).

Examples of UEs comprise terminal devices, wireless devices, mobile stations, mobile phones, handsets, wireless local loop phones, smartphones, laptop computers, tablet computers, network equipped sensors, network equipped vehicles, and so-called Internet of Things devices and any Machine Type communication device. A UE may for e.g. be any device equipped with radio circuitry adapted for URLLC communication.

The network node 200 provides network access in the wireless communication network 110 by transmitting signals to, and receiving signals from, the UE 300 using beams. The signals could be transmitted from, and received by, a network node 200, using a transmission and reception point.

In FIG. 1, the wireless devices 300a and 300b (e.g. 5G 3GPP UEs), are associated with resources (R #1, R #2) configured for configured grant (CG) and thereby being enabled to transmit a data packet, such as one or more code blocks (CB) or transport blocks (TB) in a grant free (GF) manner, which means that the UEs can transmit the data packet on the configured grant (CG) resources without receiving a dynamic grant from the network node. It may also be assumed that no explicit ACKnowledgements (ACKs) are transmitted in downlink (DL) by the network node (e.g. a gNB), as response to successfully receiving the data packet. Therefore, when the network node 300, receives a data packet on a CG resource, at least four scenarios may arise in the network node:

1. Transmission/reception success: when both UE ID (e.g., DMRS) and the data packet are received and decoded successfully.
2. Transmission/reception data error: when UE ID is received and decoded successfully but the data packet is not. In this scenario, the network node (e.g. gNB) may allocate a dynamic grant to the concerned UE so that the data packet can be retransmitted by the UE.
3. Transmission misdetection: In this case, gNB is unable to decode the UE ID but concludes a transmission of a data packet was attempted. For example, the network node detects a signal on an uplink configured grant resource configured for grant free access.
4. Transmission non-detection: In this case, gNB concludes that transmission of a data packet was not attempted. For example, the gNB may detect a signal on an uplink configured grant resource configured for grant free access but the gNB determines that the power and or energy of the signal is lower than a threshold and/or value. However, even though the energy threshold condition is not satisfied the radio network node still has a good reason to believe that a transmission was attempted by a UE using a specific configured grant resource (e.g. the "No Energy Detected" case which is not considered to be a successful signal reception case but still allows for triggering the transmission of a non-UE specific message by the radio network node).

It should be noted that in scenario 2. above and in a case when only a single UE has been configured to use the CG resources, then the gNB may send a NACK specific to the single UE or the identified UEs in scenario 2 above, by using a DCI and thereby dynamically allocate a specific PUSCH resource to be used for the packet retransmission.

For scenario 1. above, since the data packet is successfully received, there is no reason to send a NACK message. Consequently, this disclosure is mainly directed towards scenario 3 and 4.

Given the requirement of extremely high transmission reliability, the case with misdetection (3. above) cannot be ignored. Therefore, in this case, if a signal is detected but e.g. a UE ID is not decoded, then a common NACK would be broadcasted by the gNB (c.f. FIG. 1, 304) to its UEs (300a, 300b) which will receive the Common NACK (202). For the purpose of sending common NACK, a gNB detects whether enough (e.g. above a threshold) power and/or energy is received on resources configured for configured grant CG (e.g. time-frequency resources configured for UL configured grant transmission of data packets by any UE configured for grant free transmission). If decoding of a data packet received on the detected resources fails (resulting in a Transmission misdetection as described above), the gNB transmits a common NACK message indicating the resources on which the detection was performed. However, there is no need to perform such detection on UL resources for which no UE is configured with UL CG transmission, and consequently no need to send any common NACK message. It shall be mentioned that detection of an unknown signal may depend on the software and hardware implementation of e.g. a power/energy detector in the receiver. Signal detection may e.g. be dependent on the power/energy threshold setting, which can be a trade-off between the probability of a misdetection (e.g. a false alarm may be triggered if the threshold is set too low, wherein the gNB sends a Common NACK message when there were no UE grant free transmission on the UL resources configured for configured grant) and a non-detection (e.g. if a power/energy threshold is set too high the gNB does not send a Common NACK message when there were one or more actual UE transmissions). Such a power/energy threshold for detecting power and/or energy may be adjusted based on channel conditions but also of the history of the transmissions errors given that transmission success rate must be greater than target reliability.

After broadcasting a common NACK message, active UEs (e.g. URLLC UEs) associated with CG operation will receive the message (see FIG. 1, 202). Depending on the message content (e.g. the common NACK message may comprise information indicating an UL radio resource) of the common NACK, the concerned UEs may retransmit the data packet or a representation of the data packet by using a CG resource (e.g. the next UL configured grant resource after receiving the common NACK message).

A few example cases will be described in relation to the message content.

Figure 2:
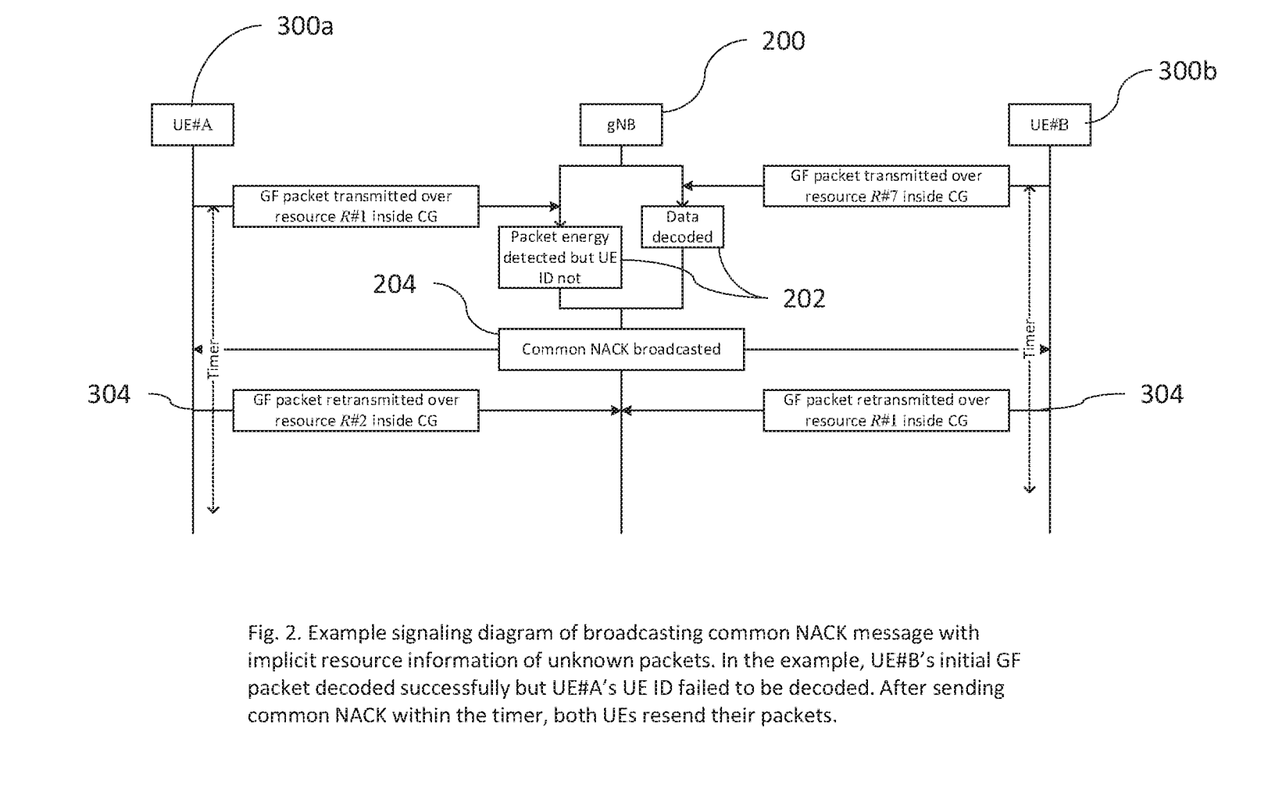

1. If the common NACK message indicates resource information associated with gNB reception of unknown packets/signals, then the UEs which had transmitted in the indicated resource will retransmit the data packet (see example signaling diagram FIG. 1).
2. If the message does not comprise any explicit indication of resource information, then all the UEs that have transmitted a data packet in a recent past-time window (e.g. after a certain point in time) will retransmit a representation of any data packet that was transmitted in the recent past-time window, see example FIG. 2. The recent past-time window can be agreed in an a-priori manner. One example is where past-time window is equal to a timer which is unique for each UE. In FIG. 2, two UEs transmit one data packet each on different UL resources configured for grant free transmission. UE #A and UE #B transmit independently on a resource configured for grant free transmission (e.g. configured grant resources) in the CG. UE #B's transmission is received and decoded successfully, but UE #A's transmission is not decoded successfully although signal energy is detected. Then gNB sends common NACK message. Since the common NACK message is transmitted within the timer of both UE's transmission; both UE #A and UE #B may assume that their respective transmissions were unsuccessful after reading the broadcasted common NACK message, and consequently both UEs will retransmit on resource from the resources in the set of resources configured for grant free transmission (e.g. resources configured for configured grant). However, if the common NACK message comprise an explicit indication of the UL resources used by UE #A (R #1 in FIG. 1) for transmission of its data packet, then only UE #A will retransmit.

It should be mentioned that a common NACK message is preferably transmitted immediately or well within a timer, in response to detecting a signal with power and/or energy but without being able to decode the UE ID of an unknown packets received on UL resources configured for grant free transmission. The timing is of particular interest when assuming that the unknown packets are URLLC transmission packets. If the indicated timer in FIG. 1 and FIG. 2, expires before receiving a common NACK message, the UE will assume that the transmission of the data packet was successful (c.f. implicit ACK) and the transmission buffer will be cleaned [4], which may cause additional delays upon a potential retransmission request from the gNB (e.g. a data packet not yet successfully received by the gNB may be deleted from the UE transmission buffer).

It is generally desired to keep DMRS reliability high, e.g. having a block error rate (BLER) below 10%. However, a reliability figure can be relative in comparison to the target reliability. When considering e.g. a traditional LTE network with a reliability aimed at 1%-10% BLER, DMRS is considered sufficiently reliable. However, for URLLC scenarios with NR or LTE, the DMRS reliability can fall short of it, e.g., when considering a URLLC reliability target of 99.999%-99.9999999%. The DMRS decoding reliability may be affected by e.g. the following conditions or scenarios:
1. Fast fading occurrence;
2. Collision or intra-cell interference scenarios;
   a. Non-orthogonal DMRS use;
   b. Receiver incapability in resolution of multiple orthogonal DMRS sequences;
3. Inter-cell interference;
4. Beam-failure,
5. Electro-magnetic interference in close operation environment, such as when a UE is operating in a factory.

The above conditions/scenarios may lead to decreased DMRS decoding reliability, which may in turn decrease the success rate in decoding a UE ID.

To construct a common NACK message, a group common DCI can be defined or reutilized for the broadcast messaging. The message content of a common NACK message may be structured in one of at least three different ways in case signals are detected on UL resources configured for grant free transmission (e.g. configured grant resources) and/or a UE ID is unsuccessfully decoded.
1. The common NACK message may comprise an implicit resource identifier, e.g. the message comprises no explicit resource indication, which may indicate to a UE that decodes the message and has transmitted a data packet after a point in time, shall retransmit the data packet or a representation of a data packet. For example, when the common NACK message is broadcasted, and the UEs decode the message, the UEs which had transmitted in the short past-time window (recent time window) will transmit again (e.g. retransmit or transmit a second representation). The message construction is simple but may slightly increase the false alarm probability as the UEs, whose data packets were successfully received by the gNB in the recent time window, may retransmit. Further variation can be offered in the message construction.
   a. The short time window (e.g. a point in time or a short past-time window) can be agreed between a network node and CG UEs in an a-priory manner, by signaling, e.g. RRC signaling.
   b. Another way is to include the short time window (e.g. a point in time or a short past-time window) or an indication of the short time window, in the message (e.g. a common NACK message). When a UE reads the broadcast message and if it finds out that its past transmission was within the short time-window, then it will retransmit the data packet.
2. The message comprises an explicit indication of the UL radio resource on which the signal was detected by the gNB, but the UE ID was not decoded. E.g. the message comprises the resource IDs associated to the unknown signals. One such basic example is presented in FIG. 3a. A UE that decodes such a common NACK message and determines that it has used the indicated UL radio resource for grant free transmission will retransmit the data packet. The data packet may be retransmitted on a same corresponding UL resource as the first transmission of the data packet.

The common NACK message may additionally be structured in a way, that it comprises a set of bits and where a position of a bit in the set can be associated with an uplink configured grant resource (e.g. Resource ID) while the bit value "0" or "1" can be interpreted as NACK and trigger a retransmission.
3. Optionally the message may also comprise a Dynamic allocation: In this case the message comprises an indication of the UL radio resource on which the signal was detected by the gNB, together with a second indication of an UL radio resource that the UE shall use when retransmitting the data packet. One such basic example is presented in FIG. 3b. When a UE decodes a common NACK message and the UE determines that it has used the indicated second UL radio resource (Resource ID #B) for grant free transmission, the UE will retransmit the data packet using on the indicated second UL radio resource, which is comprised in the message. For this case, the retransmitting UEs (after receiving the Common NACK message) can transmit in the same resource (if no new resource information is provided in the common NACK message), or in the different resource as indicated in Common NACK message. See FIG. 3b for one such example message.

Figure 3A:
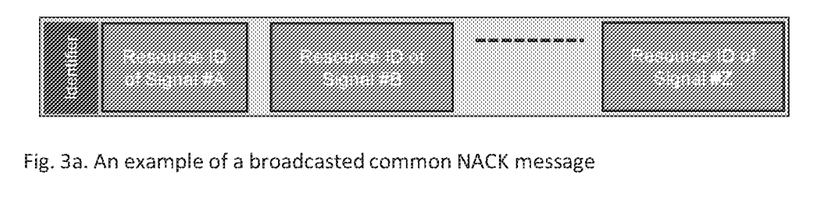
FIGS. 3a-3b illustrate different examples of a common NACK message structure.
Figure 3B:
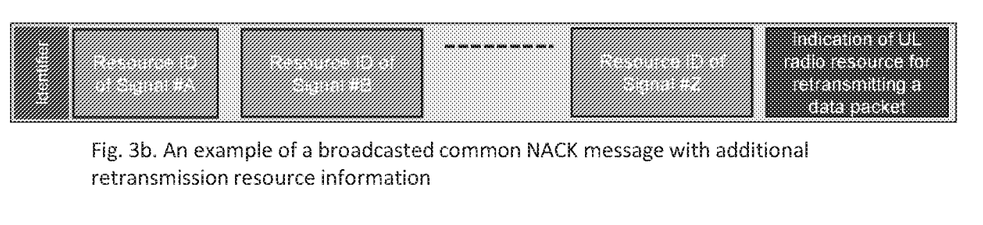

Optionally, a common NACK message may comprise an explicit identifier as indicated in e.g. FIGS. 3a and 3b, to identify the common NACK message. However, it is worth mentioning that an explicit identifier is not required but the NACK messages of interest may be identified implicitly by a UE from a combination of e.g. message size and/or radio resources used for receiving the message and/or radio network temporary identifier (RNTI) used for scrambling of the common NACK message.

Several examples are described for transmitting a common NACK message on the downlink by a gNB. A common NACK message is a non-UE specific message, which is addressed to several UEs in a cell. Suitable means to transmit such message by a network node (e.g. a gNB), are e.g., by multicasting or broadcasting signaling on higher layers (e.g. RRC) or by lower layer signaling on a common search space in a serving cell. A common search space may by common for all UEs in a cell or common for a group of UEs in a cell.

In one aspect a common NACK message may be transmitted, by a gNB, using resources in the common search space of the cell. The message may be transmitted as a Downlink Control Information (DCI) message carried by PDCCH. Optionally, the DCI is a group-common DCI associated with a new RNTI (e.g. CS-G-RNTI). In this example, all UEs configured with the CS-G-RNTI can monitor this group common DCI when its UL CG process (es) is active. All UEs in the group may be configured to monitor a common PDCCH search space of the cell.

One benefit of using DCI to transmit a DCI based common NACK message, is the message may contain a relatively large amount of information and a new RNTI can be used to scramble the CRC of the DCI bits.

In another aspect, a common NACK message may be transmitted, by a gNB, by using a NACK sequence ($S_{CNACK}$) for carrying a common NACK message. The NACK sequence may be transmitted after applying a scrambling sequence $S_{scrmb}$, wherein the scrambling sequence $S_{scrmb}$ may be obtained based on e.g. CS-G-RNTI or CS-RNTI. In general, a UE and the network has a common understanding of how to generate the scrambling sequence $S_{scrmb}$ from the CS-RNTI or CS-G-RNTI and how the scrambling sequence is applied to the NACK sequence. A UE configured for grant free transmissions can decode the sequence blindly to obtain the NACK sequence which will indicate a configured grant resource. This aspect is potentially more suitable when the number of configured grant resources are relatively small, since the number of combinations to blindly decode in the UE increases with the length of the NACK sequence. If the NACK sequence e.g. has a length, M, of 3 bits, it can be used to indicate $2^3=8$ different combinations. Therefore, these three bits may be used to indicate e.g. 8 different configured grant resources. Alternatively, one combination may be used to indicate all configured grant resources during a time interval or after a certain point in time and the remaining seven combinations can be used to indicate 7 specific configured grant resources.

If the amount of content to be carried is small (e.g., M<=3 bits), then a sequence $S_{CNACK}$ of length $N_s$ can be used to carry the common NACK. For example, if M=3 bits are to be carried, then the sequence may take 8 different sequence values, where each sequence value is a vector of length $N_s$. The M=3 bits can be used to indicate if UL signals are detected at M=3 different PRB (or PRB group) positions. If the group common RNTI, CS-G-RNTI, is defined, then the CS-G-RNTI can be used to generate a scrambling sequence $S_{scrmb}$, for example, using CS-G-RNTI as the seed of the random number generator of $S_{scrmb}$. The scrambling sequence is applied to $S_{CNACK}$ to make ($S_{CNACK}+S_{scrmb}$) before it's transmitted.

The benefit of using a sequence based method is that sequence detection is more reliable than detecting DCI (carried by PDCCH). Additionally, no CRC bits are necessary and therefore overhead is reduced.

To configure a UE for receiving common NACK messages, it may be considered that a UE can be explicitly informed, e.g. by RRC configuration to start monitoring common NACK messages, e.g. through RRC one or more parameters. Additionally, or alternatively, a UE can be implicitly informed to start monitoring for common NACK messages by presence of another parameter, e.g. a Resource ID, to monitor a common search space or broadcast message or another information which is needed for correct interpretation of a common NACK message as described herein. An example of such parameters are found in FIG. 4. Additionally, or alternatively, a UE can trigger monitoring for common NACK message always along with, or right after GF configuration or trigger monitoring based on other information, e.g. LCP- or logical channel priority rules on MAC layer, service requirements and/or based on value(s) of parameter(s). Alternatively, or additionally, a UE may trigger monitoring of common NACK messages based on receiving, from a gNB, other signaling, such as DCI to activate common NACK monitoring. In this case it is possible to reuse existing fields or possibly use a special DCI field.

Further, a division of radio resources into multiple sets of resources configured for grant free transmission (e.g. CG resources) where each CG resource in a set is associated with a group of UEs, it may be considered that. In such cases, if energy/power/signal is detected (without successfully identifying the UE ID) over a certain CG resource, then the common NACK is broadcasted to the group of UEs associated with that CG resource only. The message can be understood as group-common NACK.

In one example, the DCI may be a group-common DCI associated with a new RNTI (called CS-G-RNTI in this discussion). Thus, all UEs configured with the CS-G-RNTI can monitor this group common DCI when its UL CG process(es) is active.

Figure 5:
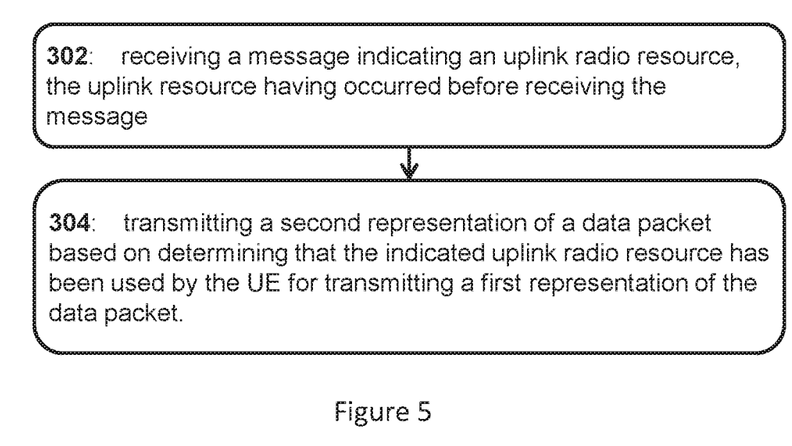
FIG. 5 is a flowchart of a method for operating a UE.

Now turning to FIG. 5, one example of a method for operating a UE in a wireless communication network, is illustrated.

In action 302 in FIG. 5, the UE receives a message indicating an uplink radio resource. The received message may be a common NACK message that comprises implicit and/or explicit information indicating an uplink radio resource, e.g. a configured grant resource. The indicated resource may occur before a point in time when the message is received, or the indicated uplink resource having occurred before receiving the message.

In action 304 in FIG. 5, the UE transmits a representation of a data packet if the UE determines that the indicated uplink resource has been used by the UE for transmitting a first representation of the same data packet. If the UE determines that it has not used the resource for any uplink transmission, the received message may not trigger any further actions by the UE. In this example, it may be considered that the message is received on resources belonging to a common search space of a cell serving the UE. The received message may e.g. be a downlink control message (DCI) that is received on a physical downlink control channel (PDCCH). In this example the message may comprise information indicating a configured grant resource, which may trigger the UE to transmit the second representation of the data packet using the indicated configured grant resource.

In action 302 of FIG. 5, if the message comprises implicit or explicit information indicating e.g. a time interval or a point in time, the UE may determine that it has used a configured grant resource in that time interval or after that time point for transmission of a first representation of a data packet and transmit (304) a second representation of the data packet, when determined (e.g. by the UE) that the UE had used that resource for transmission. Analogously, if the message comprises information indicating a specific resource, such as e.g. specific resource blocks (RB) or resource elements (RE), the UE may determine that it has used that specific resource for transmitting a first representation of a data packet and transmit (304) a second representation of the data packet, when determined that the UE had used that specific resource for transmission of a first representation of the data packet.

Figure 6:
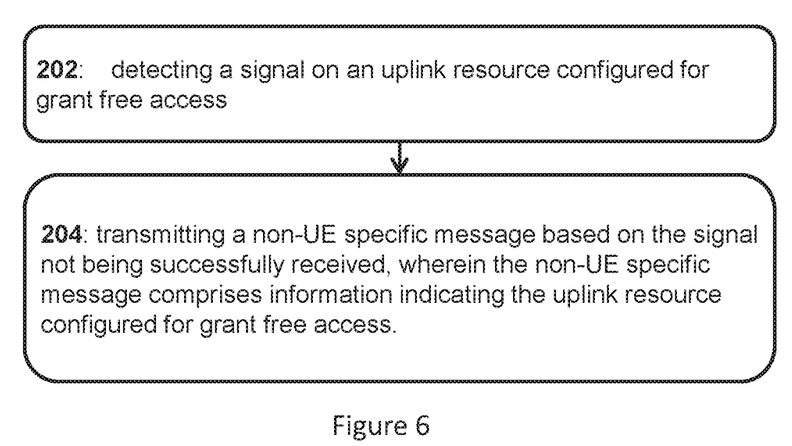
FIG. 6 is a flowchart of a method for operating a network node.

Now turning to FIG. 6 that illustrates one example of a method for operating a network node in a wireless communication network.

In action 202 in FIG. 6, the network node detects a signal on an uplink resource configured for grant free access. A signal may be any electromagnetic signal but is likely to originate from a transmitter (e.g. UE or gNB) in the wireless communication network. The signal may e.g. be interference (e.g. unwanted signals from a neighbouring cell) or a signal comprising a data packet intended for the network node. A network node detecting a signal may comprise monitoring and/or receiving on resources configured for configured grant and determining if the received power and/or energy on the uplink resource is above or below a threshold.

In action 204 of FIG. 6, if the network node determines that the received power and/or energy is above a threshold but cannot decode a UE identity (representing that it is determined that the signal was not successfully received), the network node transmits a non-UE specific message that comprises information indicating the uplink resource configured for grant free access. Alternatively, the network node determines that the received power and/or energy is below a threshold but has received an indication, e.g. Buffer Status Reports (BSR), indicating payload was pending for UEs granted the use of the uplink resource configured for grant free access, the network node may thereby determine that the signal was not successfully received (e.g. determine that a "No Energy Detected" condition exists) and therefore transmit a non-UE specific message that comprises information indicating the uplink resource configured for grant free access. The information indicating the uplink radio resource may be implicit or explicit and may indicate a specific configured grant resource or any CG resource within a time frame or any CG resource after a certain point in time.

A gNB may experience a "no energy detected" (NED) condition when monitoring and/or receiving on resources configured for configured grant, e.g. the gNB does not receive a power and/or an energy above a certain threshold on a configured grant resource. If this occurs when the gNB has previously received e.g. Buffer Status Reports, BSRs, indicating payload was pending for UEs granted the use of these transmission occasions, then the gNB can broadcast a common NACK message indicating on which radio resources these NED conditions occurred and consequently trigger a retransmission. An indication on which radio resources may e.g. be an explicit resource ID indicating a time-frequency resource or the indication may be implicit by not indicating an explicit resource ID and thereby indicating radio resources configured for grant free access after a certain point in time or during a time interval or during a certain time frame. An explicit indication of a time interval and/or point in time may also be comprised in the common NACK message and thereby indicating radio resources configured for grant free access after the certain point in time or during the time interval or during a certain time frame. If a time frame or time interval is indicated (e.g. implicitly indicated), all UEs that have used configured grant resources for transmission during this time frame or time interval are supposed to retransmit. The time frame and/or time interval may be implicitly indicated when no resource ID is present in the common NACK message. The time frame may then represent a time (e.g. a time interval) that has occurred no more than T ms before, or prior to, receiving the message. Consequently, if a UE receives and decodes such a message and has transmitted a data packet during this time frame it shall retransmit the data packet (e.g. transmit a second representation of the data packet). Note that if only a single UE has been configured to use the resources of a specific CG, then the gNB can alternatively send a NACK specific to that UE using DCI.

If a NED condition is detected, by a network node, for a specific resource configured for grant free transmissions (CG resource), which occurs within a series of successful packet receptions associated with that CG resource (e.g. when the NED condition occurs the gNB realizes that more data from the UE is pending, based on the latest received BSR information) then the network node can reasonably suspect that it has missed an uplink packet and therefore transmit (e.g. broadcast) a corresponding common NACK message.

After transmitting a representation of a data packet using a grant free resource, a UE looks for a possible common NACK message within a limited time window or time interval (T).

Upon receiving a common NACK message indicating an uplink CG resource (e.g. a specific resource ID or a time frame/time interval is indicated), due to that a NED condition occurred during one or more of the CG based transmission occasions it recently used to transmit a packet, it re-transmits the affected packets (transmits a representation of the data packet that is NACK:ed).

If the UE did not transmit a packet (e.g. a representation of the data packet for the indicated CG resources when a NED condition(s) occurred/was detected, then the UE may (a) ignore the common NACK message or (b) send a packet containing new payload (e.g. transmit a first representation of a second data packet) using the next applicable CG based transmission occasion.

A UE may perform extra monitoring of broadcast messages (or of the PDCCH common search space) when it knows it was the exclusively user of the CG resources) to determine whether or not the gNB experienced a NED condition as a result of any of its packet transmissions.

This approach allows the gNB to be cautious regarding why a NED occurred when it knows additional uplink payload is pending and thereby helps to ensure the target BLER is satisfied.

A series of multiple NED conditions may be detected following the last series of successful packet receptions on a given CG resource. This can always be expected to occur when a UE has completed the transmission of all available uplink data for e.g. LCHs or logical channels that make use of the CG resource (at which point the gNB is unaware of any pending UL data for the corresponding LCHs or logical channels). However, once a UE starts transmitting packets again (due to the arrival of new data for the LCHs) there is a risk that the first of these packets could be detected as a NED by the gNB.

As long as a gNB does not expect any additional data from the UE(s) on a given CG resource it has no reason to suspect a UE attempted packet transmission for any instance of it detecting a NED condition.

However, once the UE starts transmitting packets again (due to the arrival of new data) the first packet sent by the UE could, for example, indicate it is the first packet of a set of 2 or more additional packets.

If the gNB does not receive the first packet but receives a subsequent packet (that does not indicate it is the first of a set of 2 or more additional packets) then it can broadcast a common NACK indicating the first packet was not received and the UE can then re-transmit it.

The gNB, upon receiving the first packet, can then potentially suspect that it may have missed additional subsequent packets on that CG resource and send a common NACK accordingly.

In one aspect, UEs can be divided into groups (similar to paging signals) and then the common NACK is transmitted to a group of UEs. This will be beneficial when the common NACK message does not contain the identifier.

In another aspect, common NACK is transmitted even for the case of Transmission data error (when UE ID is decoded successfully but data is not). In this aspect, the target is to reduce the NACK signaling for a number of UEs. Since, DCI may be a scares resource in certain situations, by using common NACK instead of per UE NACK, the signaling load in DCI can be reduced and then DCI blocking can be improved.

In yet another aspect, a common NACK message is sent when the gNB has reason to believe that a NED condition corresponds to a transmission occasion on a CG resource during which a UE may have attempted packet transmission, thereby allowing the UE to be informed that it should perform retransmission of the corresponding packet (if it sent a packet during that transmission occasion).

In another example, a common NACK message can be in the format of UL pre-emption indication (PI). The UL PI indicates that in the previous one or more slots, UL URLLC transmission has occurred. The common NACK is then the complementary of PI. That is, If the UL PI indicates that UL URLLC transmission has occurred at time t0, PRB (or PRB group) position f0, then a UE can understand that there is no common NACK at (t0, f0). The PI indicates the collected UL URLLC transmission of a group of UEs, where PI indicates 'UL transmission occurred' as long as at one UE sent UL URLLC transmission.

Conversely, if the UL PI indicates that no UL URLLC transmission has occurred at time t0, PRB (or PRB group) position f0, then a UE can understand that there is common NACK for resources (t0, f0). PI indication of 'no UL transmission occurred' means that none of the UEs has transmitted any UL URLLC packets.

Typically, the UL PI is used for dynamically scheduled UL URLLC transmission, However, the same (or similar) UL PI construction can be extended to indicate semi-statically scheduled UL URLLC transmission, such as grant free transmissions on configured grant resources, as well.

Figure 7:
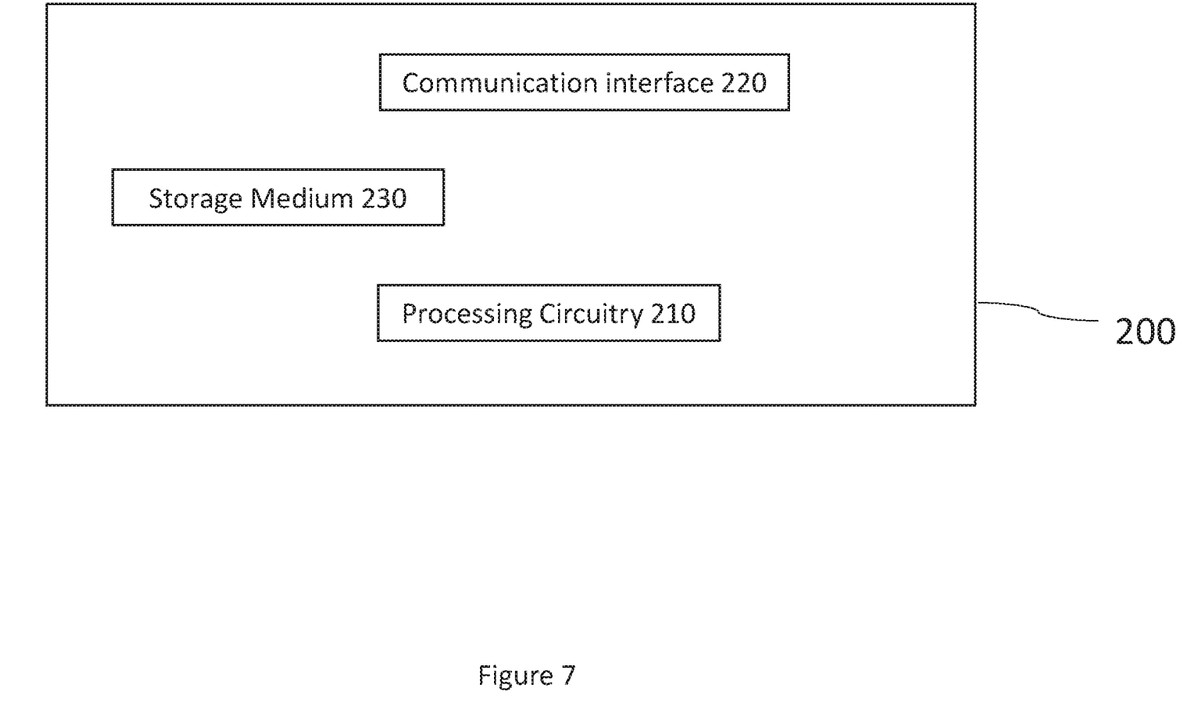
FIG. 7 is a schematic diagram showing functional units of a network node.

FIG. 7 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 230 or memory. The processing circuitry 210 may further be provided as at least one application specific integrated circuit (ASIC), or field programmable gate array (FPGA).

Particularly, the processing circuitry 210 is adapted to cause network node 200 to perform a set of operations, or actions, 202-204, as disclosed above. For example, the storage medium or memory 230 may store the set of operations, and the processing circuitry 210 may be adapted to retrieve the set of operations from the storage medium 230 to cause network node 200 to perform the set of operations. The set of operations may be provided as a set of executable instructions.

Thus, the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. Network node 200 may further comprise a communications interface 220 at least configured for communications with other nodes, device, functions, and notes of the communications network 100a. As such the communications interface 220 may comprise one or more transmitters and receivers, comprising analogue and digital components. Signals could be transmitted from, and received by, a network node 200 using the communications interface 220.

The processing circuitry 210 controls the general operation of network 200 e.g. by sending data and control signals to the communications interface 220 and the storage medium 230, by receiving data and reports from the communications interface 220, and by retrieving data and instructions from the storage medium 230. Other components, as well as the related functionality, of network node 200 are omitted in order not to obscure the concepts presented herein.

Figure 8:
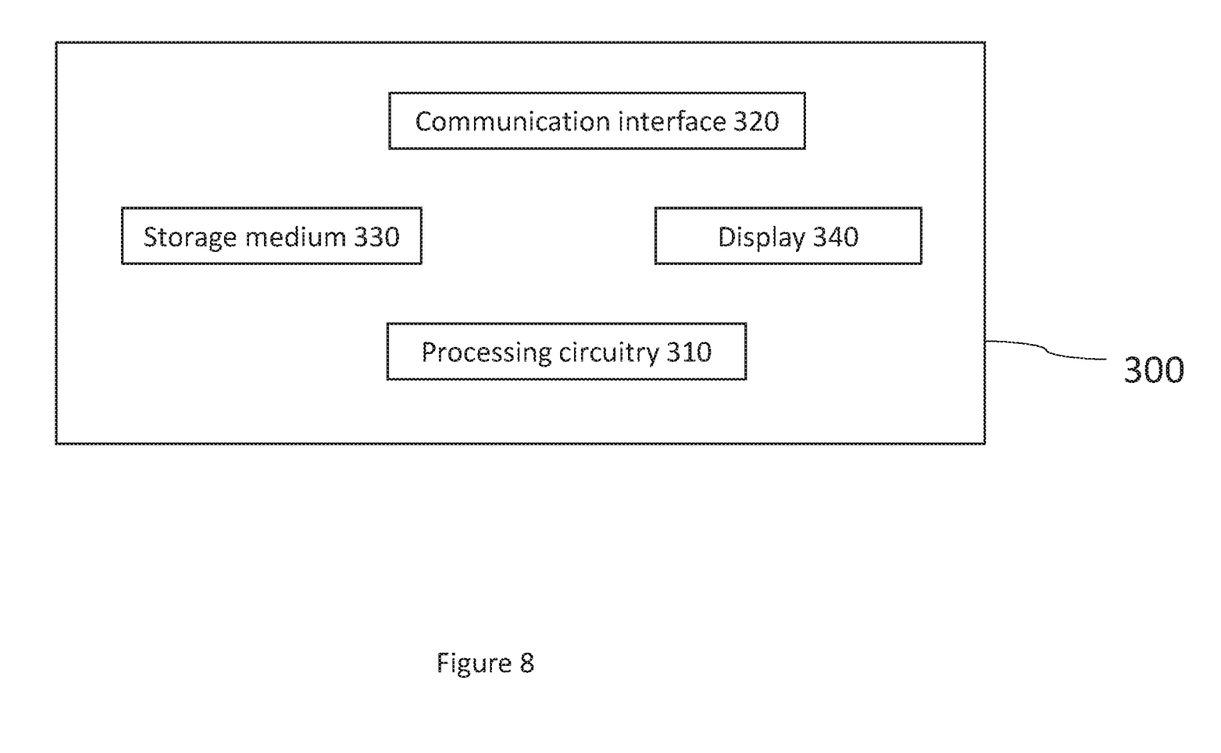
FIG. 8 is a schematic diagram showing functional units of a user equipment.

FIG. 8 schematically illustrates, in terms of a number of functional units, the components of a UE 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 910 (as in FIG. 9), e.g. in the form of a storage medium 330 or memory. The processing circuitry 310 may further be provided as at least one application specific integrated circuit (ASIC), or field programmable gate array (FPGA).

Particularly, the processing circuitry 310 is adapted to cause UE 300 to perform a set of operations, or actions, 302-304, as disclosed above. For example, the storage medium or memory 330 may store the set of operations, and the processing circuitry 310 may be adapted to retrieve the set of operations from the storage medium 330 to cause UE 300 to perform the set of operations. The set of operations may be provided as a set of executable instructions.

Thus the processing circuitry 310 is thereby arranged to execute methods as herein disclosed. The storage medium 330 may also comprise persistent storage, which, for example, can be any single one or combination of magnetic memory, optical memory, solid state memory or even remotely mounted memory. UE 300 may further comprise a communications interface 320 at least configured for communications with other nodes, device, functions, and notes of the communications network 100a. As such the communications interface 320 may comprise one or more transmitters and receivers, comprising analogue and digital components. Signals could be transmitted from, and received by, a UE 300 using the communications interface 320.

The processing circuitry 310 controls the general operation of UE 300 e.g. by sending data and/or control signals to the communications interface 320 and the storage medium 330, by receiving data and reports from the communications interface 320, and by retrieving data and instructions from the storage medium 330. Optionally the UE may include a display 340 but the embodiments herein are not limited thereto. Other components, as well as the related functionality, of UE 300 are omitted in order not to obscure the concepts presented herein.

Figure 9:
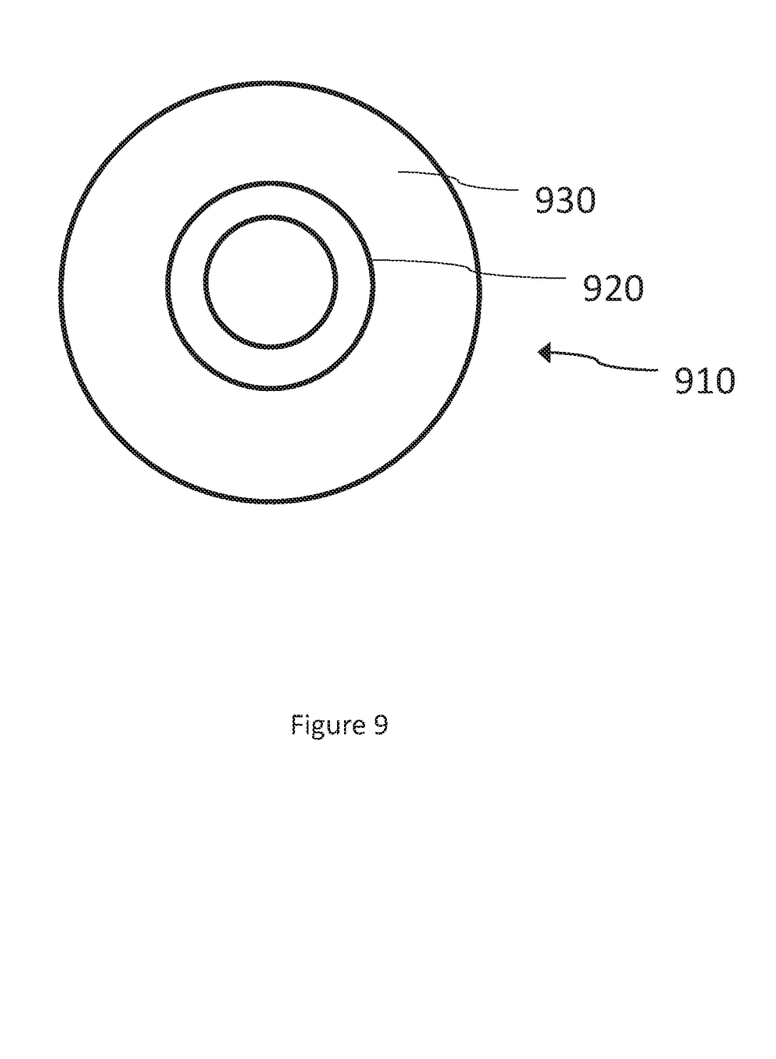
FIG. 9 shows one example of a computer program product being implemented as a computer readable storage medium.

FIG. 9 shows one example of a computer program product 910 comprising computer readable storage medium 930. On this computer readable storage medium 930, a computer program 920 can be stored, which computer program 920 can cause the processing circuitry 210 or 310 and thereto operatively coupled entities and devices, such as the communications interface 220 or 320 and the storage medium 230 or 330, to execute methods according to embodiments described herein. The computer program 920 and/or computer program product 910 may thus provide means for performing any actions as herein disclosed.

In the example of FIG. 9, the computer program product 910 is illustrated as an optical disc, such as a CD (compact disc) or a DVD (digital versatile disc) or a Blu-Ray disc. The computer program product 910 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920 is here schematically shown as a track on the depicted optical disk, the computer program 920 can be stored in any way which is suitable for the computer program product 910.

A signal may be considered not successfully received by a network node (e.g. a gNB) if e.g. a UE identity of the UE transmitting the signal, cannot be decoded or if a packet identity of a packet comprised in the signal or a DMRS sequence comprised in the signal cannot be decoded, although a detected power and/or energy of a signal on a specific resource, is above a threshold. It shall be noted that a signal may also be considered not successfully received on an uplink resource when determined that the detected power is below a threshold, while the network node has received an indication that payload is pending (e.g. a BSR) for a UE configured to use the uplink resource.

Detecting a signal on an uplink resource, by network node, may comprise e.g. receiving or measuring a power and/or energy on the resource. Alternatively or additionally, detecting may comprise determining whether a measured or received power and/or energy is greater or less than a threshold.

It may be considered that a resource, in particular a radio resource comprises e.g. time resources and/or frequency resources. In particular, a radio resource may comprise a time-frequency resource. When a UE or gNB are using a time-frequency resource for transmission or reception, it may be considered that the UE or gNB are using certain frequency resources during a time interval, wherein the time interval corresponds to the time resource. A time interval may have a starting time point and an ending time point and a length, wherein the length is defined as the time elapsed between the starting time point and the ending time point.

The frequency resource may be divided into frequency bands, such as e.g. subcarriers, wherein a subcarrier may be associated with a low frequency (LF) and a high frequency (HF) and a bandwidth (BW), wherein the bandwidth may be defined as the frequency spectrum between the low- and the high frequency. A subcarrier may further be associated with a center frequency (CF), wherein the center frequency may be defined as the high frequency+low frequency divided by two, or in other words, $CF=(HF+LF)/2$.

A subcarrier may also be associated with a distance in frequency, to its neighboring subcarrier. This distance in frequency is commonly known as subcarrier spacing and may be defined as the distance in frequency between the center frequencies of two neighbouring subcarriers.

In the context of radio resources comprising time-frequency resources, it may be considered that one radio resource occurs before, or after, another radio resource or point in time. A first radio resource is considered to occur before a second radio resource when the starting time point time of the first radio resource occurs before the starting time point of the second radio resource. Analogously, a radio resource may occur before a certain point in time if the starting time point of the radio resource occurs before the certain point in time.

It may be considered that configured grant (CG) resources are used for grant free (GF) transmissions. It may also be considered that configured grant resources are periodic, in the sense that the frequency resources are repeated in a pattern over a certain time period (e.g. one or more slots or radio frames). In general, a slot is divided into several OFDM symbols, typically 7-14 OFDM symbols per slot. In one example of a pattern of resource elements (RE) configured for grant free transmission that are repeated with a periodicity of three slots and it is assumed that a slot is divided into 7 symbols. In this example, the UL resources configured for grant free transmission are certain resource elements (RE), where one RE corresponds to a subcarrier times an OFDM symbol. The configured grant resources are allocated to the following REs:

RE #1: OFDM symbol 1 in slot 1 (S11) and subcarrier f1
RE #2: OFDM symbol 2 in slot 2 (S22) and subcarrier f2
RE #3: OFDM symbol 3 in slot 3 (S33) and subcarrier f3

In this example, since the resources are repeated with a periodicity (time period) of three slots, the same corresponding resource to RE #1 above, would e.g. be OFDM symbol 1 and subcarrier f1 in the first slot of the next period, which is slot 4. A same corresponding resource can be defined analogously in terms of other time frequency resources such as resource blocks (RB) and radio frames.

In 3GPP there is defined a feedback mechanism for transmitting data packets over the air interface, e.g. between a UE and a gNB or eNB. A receiver (e.g. UE or gNB) may e.g. transmit an ACKnowledgement (ACK) or a Negative/No ACKnowledgement (NACK) when receiving a data packet. If the data packet is received and/or decoded correctly, an ACK is normally fed back to the transmitter (e.g. UE or gNB), whereas a NACK is usually fed back to the transmitter if the data packet was not received and/or decoded correctly. In this disclosure a data packet may relate to e.g. the user data or payload, to be transmitted over the air interface. Since the format of a transmission of a data packet may vary dependent on e.g. modulation, coding and redundancy version, a transmission of a data packet may be referred to as a transmission of a first representation of the data packet, whereas a retransmission of the same data packet may be referred to as a transmission of a second representation of the data packet. Consequently, if a transmitter receives a NACK in response to a transmission of a first representation of a data packet, the NACK may trigger a transmission of a second representation of the data packet. A data packet may e.g. be a Transport Block, TB, or Code Block, CB as defined in 3GPP.

In a system where ACK/NACK feedback of data packets are used, a transmitter expects to get feedback (e.g. ACK or NACK) within a certain time interval. Such a time interval may be configured and may affect the characteristics (e.g. data bitrate and latency) of a data connection. The time interval also determines the amount of data a transmitter must be capable to buffer. A transmitter (e.g. a UE) may remove a data packet from its transmission/retransmission buffer when an ACK is received and the data packet is considered successfully transmitted and received. In this disclosure, it is considered that if a NACK is not received within a certain time interval after a point in time for transmitting a representation of the data packet, the transmission is considered successful and no further transmissions or retransmissions are required.

In this disclosure, a non-UE specific message relates to a message that is common for one or more UEs in a cell. Such a message may be transmitted and/or received using a common search space and/or broadcasted or multi casted within one cell. A common search space may comprise radio resources that one or more UEs shall monitor for messages transmitted by the network, in particular the common search space may comprise radio resources used by a cell serving the one or more UEs. A non-exhaustive list of examples of non-UE specific messages are e.g. system information messages (e.g. SIB and/or MIB), paging messages and PRACH responses which are transmitted in a common search space and scrambled with a specific radio network temporary identity (RNTI). A UE may monitor the common search space and decode the message successfully if the UE can descramble the message with a proper RNTI.

A message indicating or comprising information indicating an uplink radio resource may pertain to a message comprising an explicit indication of an uplink radio resource or may alternatively pertain to an implicit indication of an uplink radio resource. An implicit indication may be described as when the message does not comprise an explicit indication of an uplink resource, it implicitly indicates configured grant resources that has occurred no more than T ms prior to receiving or transmitting the message. An explicit indication of T may alternatively be comprised in the message indicating an uplink radio resource. T may be considered a threshold value and T is a positive real number and T may e.g. correspond to the above mentioned time interval within which a transmitter (e.g. a UE) expects to get ACK/NACK feedback, in particular to the time interval within which a UE has not received a NACK and therefore may therefore consider a transmission of a representation of a data packet successful. T may additionally or alternatively correspond to the starting point in time of the time interval.

Transmit in a grant free manner may relate to grant free transmissions. A grant free (GF) transmission may relate to transmitting a data packet on radio resources configured for configured grant (CG). Radio resources configured for configured grant may relate to uplink radio resources. Uplink radio resources are generally used by a network node (e.g. a gNB) for reception of a data packet or control data and used by a UE for transmission of a data packet or control data.

It is worth mentioning that resources, in this disclosure, generally relates to radio resources and these terms can be used interchangeably unless otherwise indicated.

A data packet may relate to a data packet on layer 2 (a layer above the physical layer in the OSI model) or MAC layer. When transmitting the data packet on the physical radio resources there are e.g. modulation- and coding operations involved. Therefore, a layer 2 data packet is somewhat altered before transmitting the data packet on radio resources. Therefore, in this disclosure, the terminology of transmitting a representation of a data packet, may refer to transmitting an altered and/or adapted layer 2 data packet wherein the alteration/adaptation of the data packet is caused by e.g. operations performed on the data packet before it is transmitted using radio resources. Therefore, a retransmission of the same data packet (e.g. layer 2 data packet) may be a transmission of another (or possibly the same) representation of the data packet.

Abbreviations

3GPP $3^{rd}$ Generation Partnership Project
5G $5^{th}$ Generation
ACK Acknowledgement
CG Configured Grant
DCI Downlink Control Information
DL Downlink
DMRS Demodulation Reference Signal
GF Grant-Free
gNB Next Generation NodeB
ID Identity
LTE Long-Term Evolution
MCS Modulation and Coding Scheme
NACK No Acknowledgement
NR New Radio
PRACH Physical Random-Access Channel
PUSCH Physical Uplink Shared Channel
SNR Signal-to-Noise Ratio
SPS Semi-Persistent Scheduling
TTI Transmission Time Interval
UE User Equipment
UL Uplink
URLLC Ultra-Reliable and Low-Latency Communications

REFERENCES

[1] 3GPP, "Study on Communication for Automation in Vertical Domains (Release 16)," TR 22.804 V16.1.0, September 2018.
[2] 3GPP, "Service requirements for the 5G system (Release 16)," 3GPP TS 22.261 V16.5.0, Tech. Rep., March 2018.
[3] 3GPP, "Physical layer procedures for data (Release 15)," TS 38.214 V15.3.0, September 2018.
[4] RAN2#100 meeting, Chairman notes, pp. 142 [Online]. http://www.3gpp.org/ftp/tsg_ran/WG2_RL2/TSGR2_100/Report/R 2-1801701.zip

The invention claimed is:

1. A method for operating a user equipment (UE) in a wireless communication network, wherein the method comprises:
  receiving a message indicating an uplink radio resource, the uplink radio resource having occurred before receiving the message; and
  transmitting a second representation of a data packet based on determining that the indicated uplink radio resource has been used by the UE for transmitting a first representation of the data packet, wherein the second representation of the data packet is transmitted using a second resource, and wherein the second resource is indicated in the message.

2. The method according to claim 1, wherein the message is received on resources belonging to a common search space.

3. The method according to claim 1, wherein the message is a Downlink Control Information (DCI) received on Physical Dedicated Control Channel (PDCCH).

4. The method according to claim 3, wherein the DCI is a group common DCI associated with a radio network temporary identifier (RNTI) dedicated for transmitting the group common DCI.

5. The method according to claim 1, wherein the second resource is a configured grant resource.

6. The method according to claim 1, wherein the uplink radio resource is a configured grant resource.

7. The method according to claim 1, wherein the uplink radio resource is a configured grant resource that has occurred no more than T ms prior to receiving the message.

8. A user equipment (UE), comprising:
   processing circuitry adapted to:
      receive a message indicating an uplink radio resource, the uplink radio resource having occurred before receiving the message; and
      transmit a second representation of a data packet based on determining that the indicated uplink radio resource has been used by the UE for transmitting a first representation of the data packet, wherein the second representation of the data packet is transmitted using a second resource, and wherein the second resource is indicated in the message.

9. A method for operating a network node in a wireless communication network, the method comprising:
   detecting a signal on an uplink radio resource configured for grant free access;
   determining that the signal was not successfully received by determining that a power and/or an energy and/or a signal quality of the signal is greater than a threshold, wherein the threshold is adjusted based on channel conditions and/or history of transmission errors; and
   transmitting a non-UE specific message based on the signal not being successfully received, wherein the non-UE specific message comprises information indicating the uplink radio resource configured for grant free access.

10. The method according to claim 9, wherein the non-UE specific message is one of a broadcasted message, a group cast message, or a multi-cast message.

11. The method according to claim 9, wherein the non-UE specific message is transmitted on resources belonging to a common search space.

12. The method according to claim 9, wherein the non-UE specific message is a Downlink Control Information (DCI) transmitted on Physical Dedicated Control Channel (PDCCH).

13. The method according to claim 12, wherein the DCI is a group common DCI associated with a radio network temporary identifier (RNTI) dedicated for transmitting the group common DCI.

14. The method according to claim 9, wherein the uplink radio resource is a configured grant resource that has occurred no more than T ms prior to transmitting the non-UE specific message.

15. The method according to claim 9, further comprising:
   receiving an indication indicating that payload was pending for one or more UEs configured for grant free access on the uplink radio resource; and
   determining that the signal was not successfully received by determining that the power and/or an energy and/or the signal quality of the signal is less than the threshold.

* * * * *